No. 883,799. PATENTED APR. 7, 1908.
W. HARBINGER.
METALLIC PACKING FOR PISTON RODS, VALVE RODS, AND THE LIKE.
APPLICATION FILED NOV. 20, 1907.

2 SHEETS—SHEET 2.

WITNESSES:
Fred White
René Ruine

INVENTOR:
Waldemar Harbinger,
By his Attorneys

UNITED STATES PATENT OFFICE.

WALDEMAR HARBINGER, OF LONDON, ENGLAND.

METALLIC PACKING FOR PISTON-RODS, VALVE-RODS, AND THE LIKE.

No. 883,799.     Specification of Letters Patent.     Patented April 7, 1908.

Application filed November 20, 1907. Serial No. 403,019.

*To all whom it may concern:*

Be it known that I, WALDEMAR HARBINGER, mechanical engineer, residing at London, England, have invented certain new and useful Improvements in Metallic Packing for Piston-Rods, Valve-Rods, and the Like, of which the following is a specification.

This invention relates to metallic packing for piston rods, valve rods, and the like, and has for its object to provide an efficient automatic metallic packing that can be applied either to existing stuffing boxes with the ordinary gland and stud arrangement, or inclosed in an independent box or casing which is secured to the cylinder cover or to the open end of the stuffing box, and to assemble and connect the various parts so that they can be safely and expeditiously taken out of the stuffing box for examination whenever occasion may demand.

Figure 1:
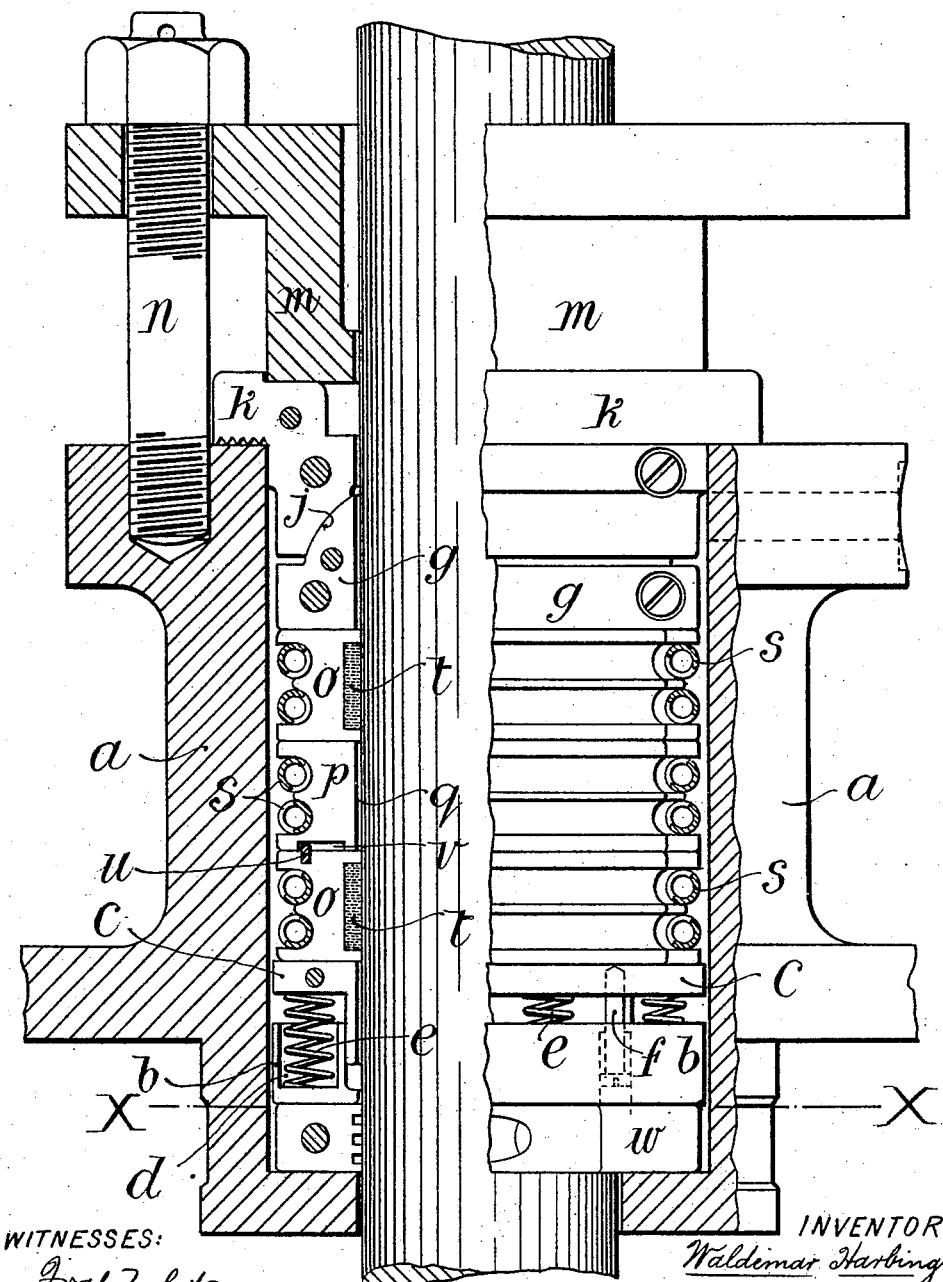
Figure 2:
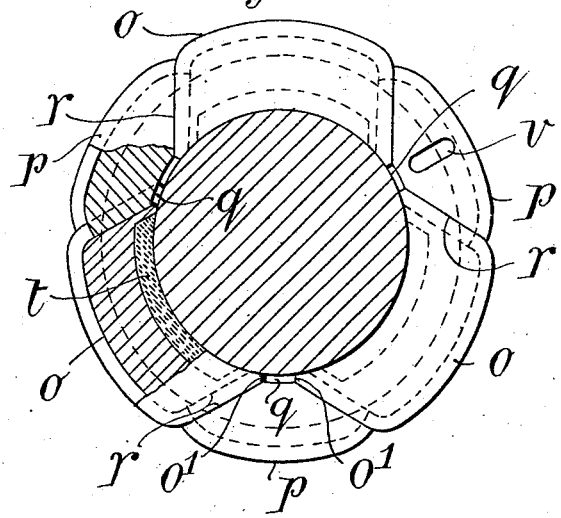
Figure 3:
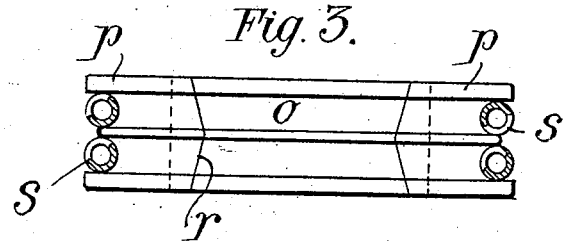
Figure 4:
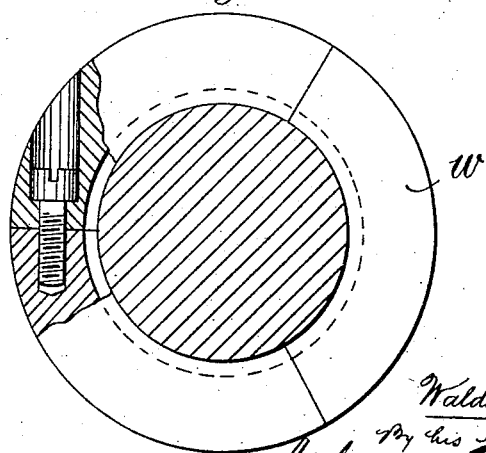

Referring to the drawings:—Figure 1 is a part sectional elevation of a metallic packing made in accordance with this invention; Fig. 2 is an elevation, partly in section, of one of the packing rings; Fig. 3 is an end view of Fig. 2 the encircling springs being in section; Fig. 4 is a part sectional elevation on line X—X Fig. 1.

In the stuffing box $a$ are disposed two rings $b$ and $c$ the ring $b$ being provided with recesses $d$ to receive the ends of the springs $e$, and the ring $c$ being L-shaped in cross section and adapted to overlap the ring $b$. The two rings $b$ and $c$ are locked together by vertical bolts $f$ which are free in the ring $b$ and screwed into the ring $c$ permitting the ring to slide upon the other, but limiting the movement in one direction.

$g$ is a ring formed with a flat surface and a spherical surface $j$; $k$ is a ring fitted into the mouth of the stuffing box and held in position by a gland $m$ and bolts $n$. This ring is provided with a spherical surface adapted to coact with the spherical surface of the ring $g$.

Between the ring $c$ and the ring $g$ are disposed three or more packing rings each composed of three or more bearing blocks $o$ and a corresponding number of guide blocks $p$. It has been found in packing rings composed of bearing blocks, and a corresponding number of guide blocks radially pressed by encircling springs, that when the bearing blocks terminate with sharp edges they turn back and prevent the guide blocks fitting closely against the bearing blocks, and it has been found that when the guide blocks touch the rod they do not make good contact with the bearing blocks. The corners of the bearing blocks are squared as at $o'$ and the guide blocks are truncated as at $p'$ so as to leave a space $q$ between the guide blocks $p$ and the rod and between the bearing blocks $o$.

The bearing blocks and guide blocks are provided with either plain parallel coacting faces or they may be provided with inclined co-acting faces $r\ r$ as shown in the drawings for the purpose of preventing axial movement between these blocks. The bearing blocks and guiding blocks are bound together by two encircling spiral springs $s\ s$. The bearing blocks are or may be formed of brass and can be provided with white metal liners $t\ t$. The coacting faces $r\ r$ where provided also prevent any tendency of the blocks to shear the springs $s$.

$u\ u$ are pins on the bearing blocks adapted to engage with slots $v$ in the guiding blocks for the purpose of keeping the blocks in their relative positions and to prevent the clearances $q$ coming in line with one another.

$w$ is a packing ring formed of three or more segments disposed between the stuffing box $a$ and the ring $b$.

What I claim and desire to secure by Letters Patent is:—

1. A metallic packing ring for piston and like rods, comprising a plurality of bearing blocks, a corresponding number of guide blocks and two encircling springs, the blocks being so formed and disposed as to leave a space such as $q$ between the rod and the guide blocks and between the bearing blocks.

2. A metallic packing ring for piston and like rods comprising a plurality of bearing blocks, a corresponding number of guide blocks and two encircling springs, the bearing blocks and the guiding blocks being provided with coacting faces $r\ r$ inclined to the face of the ring.

3. Metallic packing for piston and like rods comprising a stuffing box, a gland to said stuffing box, a ring held in place by said gland, said ring having a concave spherical face, a second ring having a convex spherical face and bearing on said first ring, sliding rings pressed apart by springs disposed within said stuffing box, three rings each composed of a plurality of bearing blocks, a corresponding number of guide blocks and two encircling springs, the blocks being so formed and disposed as to leave a space such as $q$ between the rod and the guide blocks and between the bearing blocks, substantially as set forth.

4. Metallic packing for piston and like rods comprising a stuffing box, a gland to said stuffing box, a ring held in place by said gland, said ring having a concave spherical face, a second ring having a convex spherical face and bearing on said first ring, sliding rings pressed apart by springs disposed within said stuffing box, three rings each composed of a plurality of bearing blocks, a corresponding number of guide blocks and two encircling springs, the blocks being so formed and disposed as to leave a space such as $q$ between the rod and the guide blocks and between the bearing blocks and said bearing blocks and guide blocks being provided with coacting faces $r\ r$, inclined to the face of the ring substantially as set forth.

In witness whereof, I have hereunto signed my name in the presence of two subscribing witnesses.

WALDEMAR HARBINGER.

Witnesses:
ROBERT MILTON SPEARPOINT,
H. D. JAMESON.